United States Patent Office 3,257,338

Patented June 21, 1966

3,257,338

CONCRETE COMPOSITION COMPRISING CEMENT, PRIMARY AGGREGATE, PARTICULATE EXPANDED POLYSTYRENE AND A HOMOGENIZING AGENT

Robert C. Sefton, Bridgeville, Pa., assignor to Koppers Company, Inc., a corporation of Delaware No Drawing. Filed Feb. 20, 1963, Ser. No. 260,028
2 Claims. (Cl. 260—2.5)

This invention relates generally to lightweight construction material and more particularly to lightweight concrete.

Alhough the use of concrete has increased greatly during the last decade, the weight of the concrete is still a deterrent factor in its use in many places. Ordinary structural concrete, for example, weighs about 150 pounds per cubic foot. The conventional approach for reducing the weight has been to use lightweight aggregates or foamed concrete or combinations of these. The substitution of expanded shale or blast furnace slag for the aggregeate ordinarily used in the concrete mix reduces the weight to about 100 pounds per cubic foot; and the substitution of vermiculite or pearlite reduces the weight even more.

There has now been descovered, in accordance with this invention, a concrete that has lightweight characteristics which open a wide avenue of uses for the concrete, for example, as roof slabs, core material for building partitions, ceiling tile, fence posts, telephone poles, floating docks, garden ornaments, and the like.

The novel concrete mix of this invention is comprised of cement, primary aggregate and/or filler, expanded, expandable polystyrene, and a homogenizing agent which maintains the concrete mixture homogeneous so that the composition is homogeneous throughout the block before and after curing.

The cement usable in accordance with this invention may be any of the common cements. For example, there may be used the conventional Portland cements, gypsum products (such as plaster of Paris), calcium-aluminate cement, high-alumina cement, and magnesia cement or combinations thereof. Such cements are readily available from numerous commercial sources. The choice of type of cement is usually governed by the use to be made of the concrete.

The primary aggregate or filler used in this invention may be any of the conventional aggregates or fillers normally used in the manufacture of concrete. For example, there may be used sand, vermiculite, asbestos, pearlite, wood fibers, chips, shavings and dust, excelsior, cork, slag, vermiculite, fiberglass and hemp, jute or bagasse. The choice of aggregate, of course, depends upon the use to be made of the concrete and the availability of materials. For example, wood fiber gives good tensile strength to the concrete and imparts good flexibility to the product.

The expanded styrene polymers are readily made from particles of expandable styrene polymer that are available from several manufacturers. They are usually spherical beads but can be obtained in various shapes, such as, pellets, discs, strands, and the like. Beads are commercially available that have a size to pass through a U. S. Standard 40-mesh screen but remain on a 60-mesh screen. The particles usually have incorporated therein from 3 to 15% of a light hydrocarbon, such as, hexane, which is normally liquid under ambient conditions but which is readily volatilized at an elevated temperature below the melting point of polystyrene. Heating these particles in an unconfined state expands the particles from ten to sixty times their original size. The heat may be provided in conventional ways as by hot air, hot water, infrared radiation, RF heating, and the like. Advantageously, the apparatus and method for expanding the beads described in Hugh Rodman, Jr., U.S. Patent No. 3,023,175 is used, as it enables the bulk density of the expanded particles to be easily controlled.

The expandable particles of styrene polymer have about the same density as that of water. Expandable polystyrene sold under the trademark Dylite, for example, has an actual density of 65.6 pounds per cubic foot and a bulk density of 38 pounds per cubic foot. The expansion changes this density though; and the expanded particles may have a bulk density as low as one pound per cubic foot. The bulk density of the particles can be readily obtained by weighing a volume of 625 cubic centimeters of the particles. Then each 10 grams of the particles represents a bulk density of one pound per cubic foot; for example, if 625 cubic centimeters of particles weigh 10.7 grams, the bulk density is 1.07 pounds per cubic foot.

The expanded particles are free flowing and have a satiny white appearance, and a continuous outer surface. The interior of the particles consists of a multitude of extremely fine closed cells. Expanded particles may have a diameter, for example, of 125 mils and an average cell size of 2–10 mils. The size of the expanded polystyrene particles is not critical, however.

The particles of expanded styrene polymer are not easily wetted by water and, indeed, are substantially impervious to moisture. The cement itself does not bond to polystyrene. Thus, maintaining a concrete mixture of cement, water, lightweight expanded styrene polymer beads and other aggregates in uniform and homogeneous condition until the concrete sets has been a great problem. The lightweight beads (which may be $\frac{1}{100}$ of the density of the rest of the mixture) tend to rise to the surface and to congregate together, thus giving a non-uniform mix.

In accordance with this invention, a homogenizing agent is used to disperse the expandable styrene polymer particles uniformly throughout the mix to maintain the dispersion uniform and to provide for the bonding of the styrene particles with the cement. The homogenizing agent permits the expandable polystyrene beads to be suspended evenly in a mixture of wet cement and permits various types of aggregates and fillers to be used to produce finished products having widely varying characteristics.

The homogenizing agent is comprised of the alkali metal salt of the aliphatic insoluble portion of the aromatic extract of resinous wood and the alkali metal salt of carboxylated cellulose.

The alkali metal salt of the aromatic extract of pinewood that is soluble in aromatic but insoluble in aliphatic solvents has been used heretofore in concrete. Primarily, the use has been to provide for air entrainment in the concrete. In accordance with this invention, the sodium salt of the resin is handled in the form of dry powder. The resin itself is a hard, brittle, dark-colored thermoplastic resin and is produced by extracting pinewood with a hydrocarbon solvent, such as benzene, to form a preliminary extract; evaporating the solvent from the extract to obtain a mixture of turpentine, pine oil, rosin, and the resin; and then distilling the turpentine and the pine oil from the mixture. The remaining residue is thereafter extracted with a preferential aliphatic solvent, for example, petroleum ether or gasoline, to remove the rosin. The dark-colored resinous substance that remains is freed from the excess solvent. The resin can be saponified with an alkali metal hydroxide by treatment with potassium hydroxide, for example, to produce a salt of the resin. These resins are commercially available, for example, under the trademark Vinsol NVX.

The alkali metal salts of carboxymethyl cellulose are readily available commercially. Sodium carboxymethyl cellulose, for example, is a white, odorless, tasteless, non-toxic solid.

Advantageously, the homogenizing agent is made by mixing by weight about six parts of the alkali metal salt of the aliphatic insoluble portion of the aromatic extract of pinewood, and one part of the alkali metal salt of carboxymethyl cellulose with one hundred parts of water.

The proportions of the ingredients are not particularly critical as even small amounts of the mixture of the salts give a homogenizing action. Extremely great amounts of the salts, however, because of their viscous natures when in solution, present problems in mixing.

The proportion of homogenizing agent to be added to the concrete mixture is readily determined by one skilled in the art and depends in general upon the design of the concrete mix; i.e., upon the quantity and nature of the ingredients. Too much homogenizing agent would tend to give a frothy mix, a mix having excessive slump or a powdery surface characteristic when cured. In general, a desirable proportion by weight will range from 1 part of the above aqueous mix of homogenizing agent per 3 parts of styrene polymer to 8 parts of the homogenizing agent per 1 part of styrene polymer.

Heretofore, when lightweight polymeric particles were mixed with concrete mix, there was a great difficulty in distributing the beads uniformly; and they tended to move in the mix and agglomerate. It has been found, in accordance with this invention, that the beads of polymer remain homogeneously distributed in the concrete mix. Thus, it has been possible, in accordance with this invention, to pour walls of as high as twenty feet with a mixture made in accordance with this invention and have the concrete cure without the beads collecting and agglomerating.

It has also been found that, in accordance with this invention, there is a definite interface binding of the beads and the concrete or cement. This interface binding is of such nature that if the solid concrete be sawed, the particles of expanded polymer will be cut through rather than being displaced from the concrete. The fact of this bonding though is quite surprising as many adhesives have little or no chemical attraction for polystyrene.

Preferably the homogenizing agent is prepared as described above by dispersing the salts in water. This aqueous homogenizing agent is then added to water prior to the cement and aggregate. As an alternative, the particles of polymer may be coated with the homogenizing agent, and the coated particles added to the concrete mix. In still another alternative mode of operation, the homogenizing agent may be added to the primary aggregate, that is, to the sand, slag, etc. Then this aggregate is added to the concrete mix. A still further alternative method is to add the homogenizing agent in an anhydrous condition directly to the dry powdered cement.

In the design of the concrete mixtures, it is, of course, essential that the strength of the mix be balanced against the strength of the aggregate and that the mix also meet the economic condition. It has been found, for example, that if a primary aggregate not be used, the cement apparently becomes too strong for the polymeric particles; and cracking of the resulting structure occurs.

The invention will be illustrated further by the following examples wherein, unless otherwise designated, parts are parts by weight.

*Example I*

The homogenizing agent is prepared by adding one part of the sodium salt of carboxymethyl cellulose (7 H.S. cellulose gum) and six parts of the sodium salt of the aliphatic solvent insoluble residue of the aromatic solvent extract of pinewood. (Vinsol NVX) to 100 parts of hot water. After thorough mixing, the mixture is aged for at least one day.

*Example II.—Formulation*

| | Parts |
|---|---|
| Water | 37½ |
| Homogenizing agent of Example I | 1½ |
| Portland cement | 75 |
| Granulated slag | 51 |
| Expanded polystyrene beads (Dylite) (1 lb./cu. ft. bulk density) | 1½ |

The mixing is advantageously carried out as follows: Place water in a cement mixer and add the homogenizing agent. Mix for about 15 seconds. Add cement while mixer is running, and mix for one minute. Add the slag (primary aggregate) and expanded polystyrene beads together slowly, taking approximately two minutes. After all the ingredients have been added, allow them to mix for approximately two minutes for a total mixing time of approximately 5½ minutes. The mixing time does not appear to be critical except, of course, that good mixing must be obtained. After an initial good mixing, the mixture can be left for 15 or 20 minutes and can be remixed, if desired. It can be poured directly from the mixer into a suitable form.

The resulting concrete cast from the composition is homogeneous in appearance, is light gray, and tends to be friable. It has a density of 24 pounds per cubic foot and a compressive strength of 360 pounds per square inch.

For comparison purposes, a mix was made using the formulation above except that the expanded polymer particles were omitted. The concrete structure cast from this formulation was dusty and quite friable. It had a density of 92 pounds per cubic foot and a compressive strength of 900 pounds per square inch.

As a further comparison, the above formulation was prepared except that the primary aggregate, the granulated slag, was omitted. The resulting composition cracked upon curing so that only density could be determined. It had a density of 27 pounds per cubic foot.

*Example III.—Formulation*

124 parts water
7 parts of the homogenizing agent of Example I
7 parts of fine wood fiber
224 parts of Portland cement
14 parts of expanded expandable polystyrene beads (Dylite) (1 lb./cu. ft. bulk density)

The formulation is mixed in accordance with the procedure of Example II. The cured castings made from this formulation had a density of twenty pounds per cubic foot and a compressive strength of three hundred fifty pounds per square inch.

*Example IV*

To 75 parts of Portland cement was added 1 part of powdered sodium carboxymethyl cellulose and 6 parts of the powdered alkali metal salt of the aliphatic insoluble residue of the aromatic extract of pinewood. After thorough mixing, the mixture can be placed in a moisture-proof container, and kept indefinitely. There was then added to the mixture 37 parts water; and this mixture was thoroughly mixed. Thereafter, there was added 51 parts of granulated slag and 1½ parts of expanded styrene polymer. The resulting composition was cast into blocks 4 inches x 4 inches x 8 inches.

*Example V*

The formulation of Example II was followed except that in the mixing procedure, the expanded polystyrene particles were coated by mixing the same with the homogenizing agent of Example I. The particles may or may not be allowed to dry as desired. Thereafter, the parts of water were added to a mixer and Portland cement was added thereto. Mixing was continued for one minute, and the fine wood fiber and the expanded and coated polystyrene particles were added slowly to the mix, this addition taking approximately two minutes; thereafter the mix was continued for 5 minutes and the mix placed into a suitable form and cured. The resulting composition was comparable to the composition of Example II.

*Example VI*

To 51 parts of granulated slag was added 1½ parts of the homogenizing agent of Example I. The slag was thus coated with the agent and permitted to dry, although it may be used wet, if desired; 37½ parts of water were added to a mixer and thereafter 75 parts of Portland cement added. Mixing was continued for one minute whereupon the coated slag and 1½ parts of expanded polystyrene particles were added over a period of about 2 minutes. Thereafter, the mixing was continued for 5 minutes. The mixture was then poured into forms. The results were comparable to those of Example II.

The term polystyrene and styrene polymer as used herein is intended to refer to both homopolymers of styrene and copolymers of styrene. Styrene monomer may, for example, be copolymerized with other monomers such as the conjugated 1,3-dienes, e.g., butadiene, isoprene, etc., alpha,beta-unsaturated monocarboxylic acids and derivatives, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, divinyl benzene, etc. The copolymers of styrene, however, should contain at least 50% and preferably more than 75 weight percent of styrene. The styrene polymer may be blended with other polymers, e.g., styrene polymer blended with rubbery diene polymers and analogous compositions produced by polymerizing a solution of a rubbery diene polymer dissolved in styrene monomer. The term styrene is also intended to include corresponding polymers and copolymers of closely related homologues, e.g., alphamethylstyrene, o-, m-, and p-ethylstyrenes, o-, m-, and p-methylstyrenes, 2,4-dimethylstyrene, etc.

The foregoing has presented a novel concrete composition. The resulting casting is a lightweight concrete composition whose characteristics may be widely varied dependent upon the amount of expanded polymer, the type of concrete, and the type of aggregate used in the composition.

The composition remains homogeneous and has surprising strength, thermo, and esthetic properties. It is, of course, readily apparent that the visual properties of the concrete may be varied by varying the color of the cement by adding conventional pigments to the cement and by dyeing or otherwise coloring the expanded polystyrene particles.

I claim:

1. A concrete mixture comprised of cement, a primary aggregate, particulate expanded styrene polymer, and a homogenizing agent consisting of the alkali metal salt of carboxymethyl cellulose, and the alkali metal salt of the aliphatic insoluble portion of the aromatic extract of pinewood.

2. A concrete composition comprised of cement, an aggregate, expanded particles of expandable polystyrene, and a homogenizing agent, said homogenizing agent being formed by dispersing by weight about one part of the sodium salt of carboxymethyl cellulose and one part of the sodium salt of the aliphatic solvent insoluble portion of the aromatic extract of pinewood in one hundred parts of water.

References Cited by the Examiner

UNITED STATES PATENTS

| | | | |
|---|---|---|---|
| 2,787,809 | 4/1957 | Stastny | 260—2.5 |
| 2,797,201 | 6/1957 | Veatch et al. | 260—2.5 |
| 2,806,509 | 9/1957 | Bozzacco et al. | 260—2.5 |
| 2,993,016 | 7/1961 | Sucetti | 260—29.4 |
| 3,021,291 | 2/1962 | Thiessen | 260—2.5 |
| 3,214,393 | 10/1965 | Sefton | 260—2.5 |

FOREIGN PATENTS

| | | |
|---|---|---|
| 742,803 | 1/1956 | Great Britain. |
| 836,499 | 6/1960 | Great Britain. |

MURRAY TILLMAN, *Primary Examiner.*

M. FOELAK, *Assistant Examiner.*